United States Patent

Massaglia

[15] 3,712,236
[45] Jan. 23, 1973

[54] MEAT HOOK RETAINER
[72] Inventor: Leondro A. Massaglia, San Mateo, Calif.
[73] Assignee: Leo Kusber, Daly City, Calif. ; a part interest
[22] Filed: Oct. 30, 1970
[21] Appl. No.: 85,559

[52] U.S. Cl. ................................................104/93
[51] Int. Cl. ...............................................B61b 3/00
[58] Field of Search ......272/85; 17/44.3; 104/81, 89, 104/93, 96, 97, 112, 113, 114, 249, 250, 251; 105/150

[56] References Cited

UNITED STATES PATENTS

| | | |
|---|---|---|
| 2,307,141 | 1/1943 | Ladd ............................ 104/81 |
| 1,731,532 | 10/1929 | Hoppes ........................ 272/85 |
| 3,429,278 | 2/1969 | Gonzales ..................... 104/89 |
| 3,138,114 | 6/1964 | Knippel ....................... 17/44.3 |
| 3,326,138 | 6/1967 | Thomas ....................... 104/249 |
| 3,323,469 | 6/1967 | Kellam ........................ 104/89 |
| 3,227,097 | 1/1966 | Chaney ....................... 17/44.3 |

*Primary Examiner*—Gerald M. Forlenza
*Assistant Examiner*—D. W. Keen
*Attorney*—Huebner & Worrel

[57] ABSTRACT

A meat hook retainer having a hanger clamp releasably adjustably positionable on a meat hook rail and including a hook clamping mechanism releasably to hold meat hooks in stationary relation to the rail in optimum meat receiving position.

6 Claims, 4 Drawing Figures

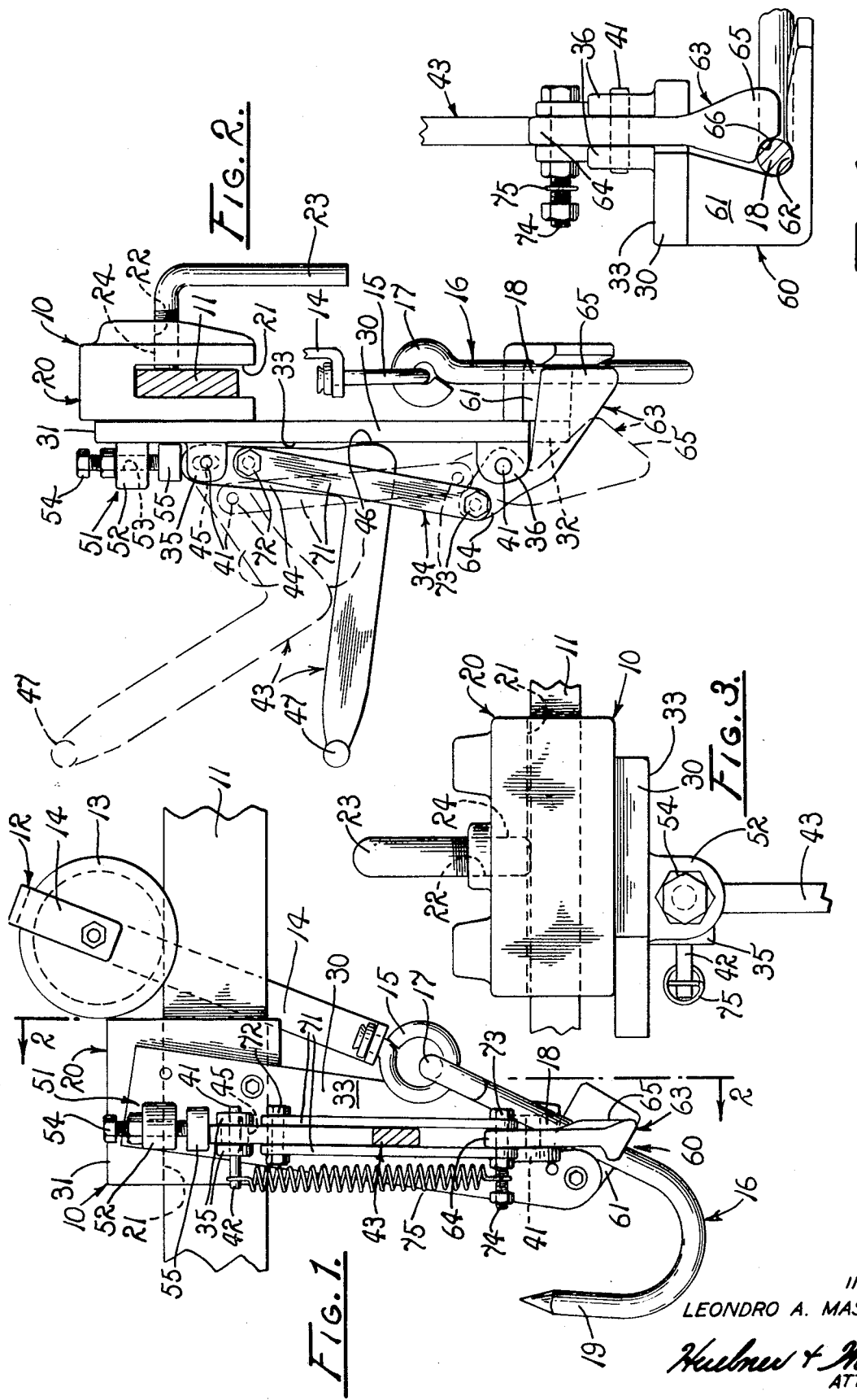

MEAT HOOK RETAINER

BACKGROUND OF THE INVENTION

Large carcasses of meat are usually stored in cold storage lockers before cutting or otherwise processing them. Conventionally, such carcasses are individually hung on meat hooks during storage. The meat hooks are usually swingably, rotatably, dependently mounted on roller brackets which are mounted on elevated tracks or rails so that the carcasses are freely suspended above the floor of the locker. Ordinarily, when the carcasses are delivered to cold storage lockers it is necessary to have one man hold the selected meat hook steady while another man hangs the carcass on the hook. It is often quite difficult to hold the hook steady because of the great weight of some large carcasses and such two-man operation is obviously inefficient.

Thus, several types of meat hook retainers have been utilized. However, previously used meat hook retainers have been deficient in a number of respects. They have usually not been of a type which are both easily positionable along their respective mounting rails and capable of being securely fastened thereto. The advantage of positionability is obvious particularly in large storage lockers where substantial quantities of meat are handled. But while this is desirable, of primary importance is the holding of the meat hook securely in position while a carcass is hung thereon. Previously both of these objectives have not successfully been achieved in one device. Furthermore, previous devices have usually only been capable of properly holding meat hooks of a single predetermined size. Consequently as the meat hook wears from continued use, it becomes less and less possible for the device to retain the meat hook securely in position, Moreover, such devices cannot properly retain meat hooks of sizes other than that for which they were specifically designed.

Therefore, it is an object of the present invention to provide an improved meat hook retainer.

Another object is to provide a meat hook retainer which is capable of dependably and securely holding a meat hook in optimum meat receiving position.

Another object is to provide a meat hook retainer which makes possible the hanging of a carcass on a meat hook by a single person.

Another object is to provide a meat hook retainer which is adapted easily to receive and to clamp meat hooks with a minimum of manuevering of the hooks and manipulation of the retainer.

Another object is to provide a meat hook retainer which is easily and conveniently adjustable for use on a variety of sizes of meat hooks and meat hook mounting rails.

Another object is to provide a meat hook retainer of sturdy relatively inexpensive construction.

Further objects of the present invention are to provide improved elements and arrangements thereof in an apparatus for the purposes set forth which is fully effective in achieving in rigid intended purposes.

These together with other objects and advantages of the present invention, will become more fully apparent upon reference to the following description in the specification and accompanying drawing.

BRIEF DESCRIPTION OF THE DRAWING

In the drawing:

FIG. 1 is a front elevation of a meat hook retainer embodying the principles of the present invention shown mounted on an elevated track holding a meat hook in rigid meat receiving position thereon.

FIG. 2 is a transverse vertical section, taken on line 2—2 of FIG. 1, showing the meat hook retainer of the present invention in side elevation with a lever arm and adjustment assembly shown in a released position in dashed lines.

FIG. 3 is a somewhat enlarged fragmentary top plan view of the meat hook retainer of the present invention.

FIG. 4 is a somewhat enlarged fragmentary bottom plan view of the meat hook retainer of the present invention.

DESCRIPTION OF THE PREFERRED EMBODIMENT

Referring in greater particularity to the drawing a meat hook retainer embodying the principles of the present invention is generally indicated by the reference numeral 10. The meat hook retainer is adapted to be mounted on an overhead track or rail 11 in a meat storage locker. A meat hook carrier or trolley 12 is mounted for substantially free longitudinal movement along the rail. The trolley provides a roller 13 rollably engaging the rail and a depending hanger strap 14 having a lower end extended below the rail. The lower end of the strap rotatably mounts a swivel eye 15. A meat hook 16 has an upper looped end 17 linked through the swivel eye, an intermediate shank portion 18 and an opposite return bent pointed meat receiving end 19.

The meat hook retainer 10 includes a slotted rail mounting head 20 having a longitudinal rectangular slot 21 therein which opens downwardly and is of a size to permit the rail 11 or rails of other dimensions to be received therewithin. The head further provides a transverse internally threaded borehole 22 of a predetermined diameter which communicates with the slot, as best shown in FIG. 2. An angulated cylindrical tightening bar 23, having an externally threaded end 24, is threadably received in the borehole. The threaded end of the tightening bar is tempered to a suitable hardness to permit it to cut into the softer metal of the rail.

A mounting arm 30, having an upper end 31, a lower end 32 and a face 33, is affixed to the rail mounting head 20 at its upper end, as shown best in FIG. 1. An adjustment assembly 34 is provided on the face of the arm. A pair of parallel lever arm flanges 35 are laterally extended from the face of the arm in a predetermined position adjacent to the upper end of the arm. A pair of parallel clamp flanges 36 extend laterally from the face at the lower end of the arm in predetermined spaced relation from and in alignment with the lever arm flanges. A pair of pins 41 individually extend between and normal to the lever arm flanges and the clamp flanges. The pin of the lever arm flanges provides an extension 42 which protrudes a short distance laterally therefrom to a side of the arm. An angulated lever arm 43, having a cam end 44 in which is positioned a lost-motion slot 45, is rotatably mounted between the lever arm flanges with the pin 41 thereof extending through the lost motion slot. Thus, the cam end of the lever arm can be moved a short distance toward the upper end of the arm from the flanges as governed by the length of the slot. The lever arm further includes a central stop portion 46 and a handle end 47.

A control or stop mechanism 51 is provided on the upper end 31 of the face 33 of the mounting arm 30. The stop mechanism includes an integral mounting flange 52 which extends outwardly from the face 33 a predetermined relatively short distance above the lever arm flanges 35 at the upper end 31 of the mounting arm, as shown in FIGS. 1 and 2. The mounting flange has an internally threaded borehole 53 therethrough whose axis extends toward the lower end 32 and is parallel to the mounting arm. An adjustable lock nut assembly 54 is threadably received in the borehole and provides a stop 55 at the end thereof which is adjustably positionable between the mounting flange and the cam end 44 of the lever arm 43.

A meat hook clamp assembly 60 is provided at the lower end 32 of the mounting arm 30. The clamp assembly includes a fixed clamp plate 61 which is mounted on the lower end of the mounting arm so that it extends at an angle to the arm and downwardly therefrom to the opposite side of the mounting arm from the extension 42 of pin 41 of the lever arm flanges 35, as shown in FIGS. 1, 2, and 4. A groove 62 is provided in the clamp plate which has an axis normal to the clamp plate. The clamp assembly further includes a clamp lever 63 which is rotatably mounted on the pin 41 between the clamp flanges 36. The clamp lever has an attachment end 64 and an opposite grasping end 65 which is positionable against the clamp plate. A groove 66 is provided in the grasping end of the clamp lever which matches the groove of the clamp plate.

A pair of link bars 71 are pivotally attached at each of their corresponding ends individually on opposite sides of the attachment end 64 of the clamp lever 63 and the lever arm 43 adjacent to the lever arm flanges 35 by upper and lower pivot bolt and nut assemblies 72 and 73, respectively, The lower bolt and nut assembly has an extension 74 laterally protruding therefrom in the same direction and parallel to the extension 42 of the upper pin 41. A tension spring 75 is affixed at its opposite ends to the extensions 42 and 74, respectively.

OPERATION

The operation of the described embodiment of the subject invention is believed to be readily apparent and is briefly summarized at this point. The meat hook retainer 10 is mounted on the rail 11 in the desired predetermined meat loading location by slipping the rail mounting head 20 over the rail so that the rail is received in the slot 21 and the mounting arm 30 extends therebelow, as shown best in FIG. 2. The tightening bar 23 is then threaded into the borehole 22 of the rail mount 20 until the threaded end 24 impinges on and tightly grasps the rail, thus locking the meat hook retainer in place.

Subsequently, a selected meat hook trolley 12 is moved along the rail 11 to a position adjacent to the rail mounting head 20 with the meat hook 16 suspended in adjacent spaced relation to the clamp assembly 60. The lever arm 43 of the meat hook retainer 10 is then moved to the position shown in dashed lines in FIG. 2 so that the grasping end 65 of the clamp lever 63 is rotated away from the clamp plate 61 by connecting link bars 71. The meat hook 16 is then manually swung toward the clamping assembly and the shank portion 18 thereof positioned in the groove 62 of the clamp plate, as best shown in FIG. 1. In such position, it is noted that the pointed end 19 of the hook is disposed in a substantially upright vertical attitude in optimum meat receiving position. With the meat hook held in this position, the lever arm is manually moved back to the position shown in full lines in FIG. 2. As the lever arm is rotated, its cam end 44 is caused to move toward the stop 55 of the stop mechanism 51 by virtue of the lost-motion slot 45 under the influence of the tension spring 75, and the relatively rigid link bars. Upon contacting of the stop and with the continued movement of the lever arm, the stop serves as a fulcrum and the lever arm is caused to move downwardly slightly by virtue of its slot 45 to compensate for the movement of the upper pivot bolt 72 to the full line locked position of FIG. 2 in over-center relation to a line passing through the centers of the lower pivot bolt 73 and the upper pin 41. Such downward movement of the lever arm is transmitted by the link bars 71 further to rotate the clamp lever in tightly clamping relation against the shank portion of the hook as shown in FIG. 4.

Such over-center movement is limited by engagement of the stop portion 46 of the lever arm 43 with the face 33 of the mounting arm 30. Thus, the meat hook is securely grasped within the grooves 62 and 66 of the clamp plate 61 and grasping end 65 of the clamp lever 63, respectively. The grasping pressure of the clamp assembly 60 is conveniently and easily adjusted in order to enable the device to grasp meat hooks of various sizes and to allow for wearing of the meat hooks by manipulation of the stop mechanism 51 upon adjustment of the lock nut assembly 54. This adjustment controls the effective length of the lever arm between the stop 55 or fulcrum and the lower pivot bolt 73.

A meat carcass, not shown, is then hung on the meat hook 16 in the usual manner. Subsequently, the lever arm 43 is again rotated to the position shown in dashed lines in FIG. 2 to free the meat hook from the clamping assembly 60. The meat hook with the weight of the meat carcass thereon gravitationally swings the hook and hanger strap 14 to a substantially vertical position and away from the meat hook retainer 10 as can best be visualized in FIG. 1. This provides an initial impetus to movement of the trolley 12 along the rail 11 away from the meat hook retainer 10.

Therefore, it is readily apparent that the device of the present invention provides an improved meat hook retainer which is quickly and easily mountable in virtually any desired location along a meat hook rail and allows a single operator to attach a meat carcass to a meat hook of virtually any size without the necessity of having another operator hold the meat hook. The device also imparts a motive force to the meat hook trolley upon its initial release from the retainer to facilitate manual positioning of the meat carcass held by the hook along the rail.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A meat hook retainer for use on elevated rails having meat hooks mounted thereon for travel longitudinally thereof in suspended substantially straight pendulous relation comprising mounting means releasably positionable on such a rail; an elongated arm extended in depending relation from said mounting means in predetermined angular relation from a plane normal to the rail; and hook clamping means borne by the arm releasably engageable with a selected hook to hold the same in optimum meat receiving position angularly related to said straight suspended position so that upon release of the hook from the retainer it automatically returns to its straight suspended position and provides a force to roll the hook away from the retainer, said hooks individually including upper roller mounting portions rollably engageable with said rails, said mounting means being adapted to abut said roller mounting portion of the selected hook, and said clamping means being longitudinally displaced in the plane of the rail from said mounting means oppositely from said abutting roller mounting portion of the hooks, the hook clamping means having a stationary clamping member on the arm, a lever system having a movable clamping member pivotally mounted on said elongated arm for movement between open and closed positions toward and from said stationary clamping member, and an actuating member operatively connected to said movable clamping member and providing a movable fulcrum for the lever system adjustably to regulate the extent of opening and closing of the clamping members to accommodate different sizes of hooks, the elongated arm providing an upper end secured to the mounting means on the rail and an opposite lower end, said actuating member comprising an actuating lever pivotally mounted on said upper end of the arm, said movable clamping member comprising a clamping lever pivotally mounted on said lower end of the arm adjacent to said stationary clamping member, and link means having opposite ends respectively pivotally connected to said actuating lever and to said clamping lever with the pivotal connection between the actuating arm and the link means being positionable over center passed an imaginary line extended through the pivotal connection of the actuating lever on the arm and the pivotal connection between the clamping lever and the link means releasably to hold the clamping lever in predetermined clamping relation to said clamping member.

2. The meat hook retainer of claim 1 wherein said actuating lever has an elongated lost-motion slot at its pivotal connection with the arm and a camming end adjacent to the slot, an adjustable fulcrum stop member mounted on said arm for engagement with the camming end of the actuating lever during said over center movement to shift the actuating lever toward the clamping lever in compensating relation to said over center movement.

3. In combination with a supporting track, a trolley mounted on the track for free movement therealong, and a meat hook pendantly supported on the trolley for pivotal movement in the plane of the track having an elongated shank providing a return bent lower end; a meat hook retainer comprising a head mounted on the track for adjustable movement therealong, releasable means borne by the head engageable with the track to lock the head in fixed position on the track in blocking relation to movement of the trolley theretoward, an arm rigidly mounted on the head and downwardly extended therefrom, and a clamp mounted on the lower end of the arm releasably engageable with the shank of the hook with the trolley blocked by the head, the hook pivoted upwardly under the head and the return bent lower end of the hook upwardly extended in the plane of the track at the side of the head opposite to the trolley.

4. The combination of claim 3 in which the clamp comprises means rigid with the arm extended transversely of the plane of the track having a hook receiving groove therein disposed in said plane upwardly and oppositely from the trolley, and a clamping lever pivotally mounted on the arm for movement about an axis substantially parallel to the track between a position adjacent to the groove to clamp the hook therein and a position retracted therefrom.

5. The combination of a supporting track, a head supported on the track for adjustable movement longitudinally therealong, releasable means for locking the head rigidly on the track, a trolley mounted on the track for movement therealong, the head being engageable with the trolley to block movement of the trolley theretoward when the head is locked on the track, a meat hook pendantly mounted on the trolley for pivotal movement in the plane of the track upwardly beneath the head, and a clamp releasably engageable with the hook to hold the hook upwardly pivoted beneath the head and to dispose the hook on the opposite side of the head from the trolley to receive meat thereon.

6. The combination of claim 5 in which the hook is swivelly mounted on the trolley and the clamp comprises means for locking the hook against rotation.

* * * * *

UNITED STATES PATENT OFFICE
CERTIFICATE OF CORRECTION

Patent No. 3,712,236       Dated January 23, 1973

Inventor(s)     Leondro A. Massaglia

It is certified that error appears in the above-identified patent and that said Letters Patent are hereby corrected as shown below:

Column 1, line 60, change "in rigid" to ---its---.

Signed and sealed this 29th day of May 1973.

(SEAL)
Attest:

EDWARD M. FLETCHER, JR.       ROBERT GOTTSCHALK
Attesting Officer               Commissioner of Patents